(12) United States Patent
Daiku

(10) Patent No.: US 11,838,454 B2
(45) Date of Patent: Dec. 5, 2023

(54) INSPECTION APPARATUS, CONTROL METHOD THEREOF, AND STORAGE MEDIUM

(71) Applicant: CANON KABUSHIKI KAISHA, Tokyo (JP)

(72) Inventor: Yuki Daiku, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/295,312

(22) Filed: Apr. 4, 2023

(65) Prior Publication Data
US 2023/0336667 A1 Oct. 19, 2023

(30) Foreign Application Priority Data

Apr. 13, 2022 (JP) .................................. 2022-066492
Sep. 1, 2022 (JP) .................................. 2022-139347

(51) Int. Cl.
*H04N 1/00* (2006.01)

(52) U.S. Cl.
CPC ..... *H04N 1/00013* (2013.01); *H04N 1/00005* (2013.01); *H04N 1/0009* (2013.01); *H04N 1/00045* (2013.01); *H04N 1/0066* (2013.01); *H04N 1/00082* (2013.01)

(58) Field of Classification Search
None
See application file for complete search history.

(56) References Cited

U.S. PATENT DOCUMENTS

2010/0202687 A1 * 8/2010 Melbourne ............... G06T 7/20
382/173

FOREIGN PATENT DOCUMENTS

| CA | 2121958 C * 1/2000 | ......... G03G 15/0855 |
| CA | 2763576 A1 * 12/2010 | ............ B25J 9/1612 |
| JP | 2014117841 A 6/2014 |

* cited by examiner

*Primary Examiner* — Darryl V Dottin
(74) *Attorney, Agent, or Firm* — ROSSI, KIMMS & McDOWELL LLP

(57) ABSTRACT

The present invention provides an inspection apparatus including a reading unit configured to read a document. The inspection apparatus compares a read image obtained by the reading unit reading a chart including a mark for acquiring distortion information printed by a printing apparatus and a reference image serving as a correct image of the chart, and generates distortion information when reading by the reading unit; and corrects, using the generated distortion information, an inspection target image obtained by the reading unit reading a printed matter from the printing apparatus; aligns the first corrected image corrected in the correcting with a reference image of the printed matter; and compares a second corrected image aligned in the aligning with a reference image of the printed matter to inspect a defect of the printed matter.

16 Claims, 15 Drawing Sheets

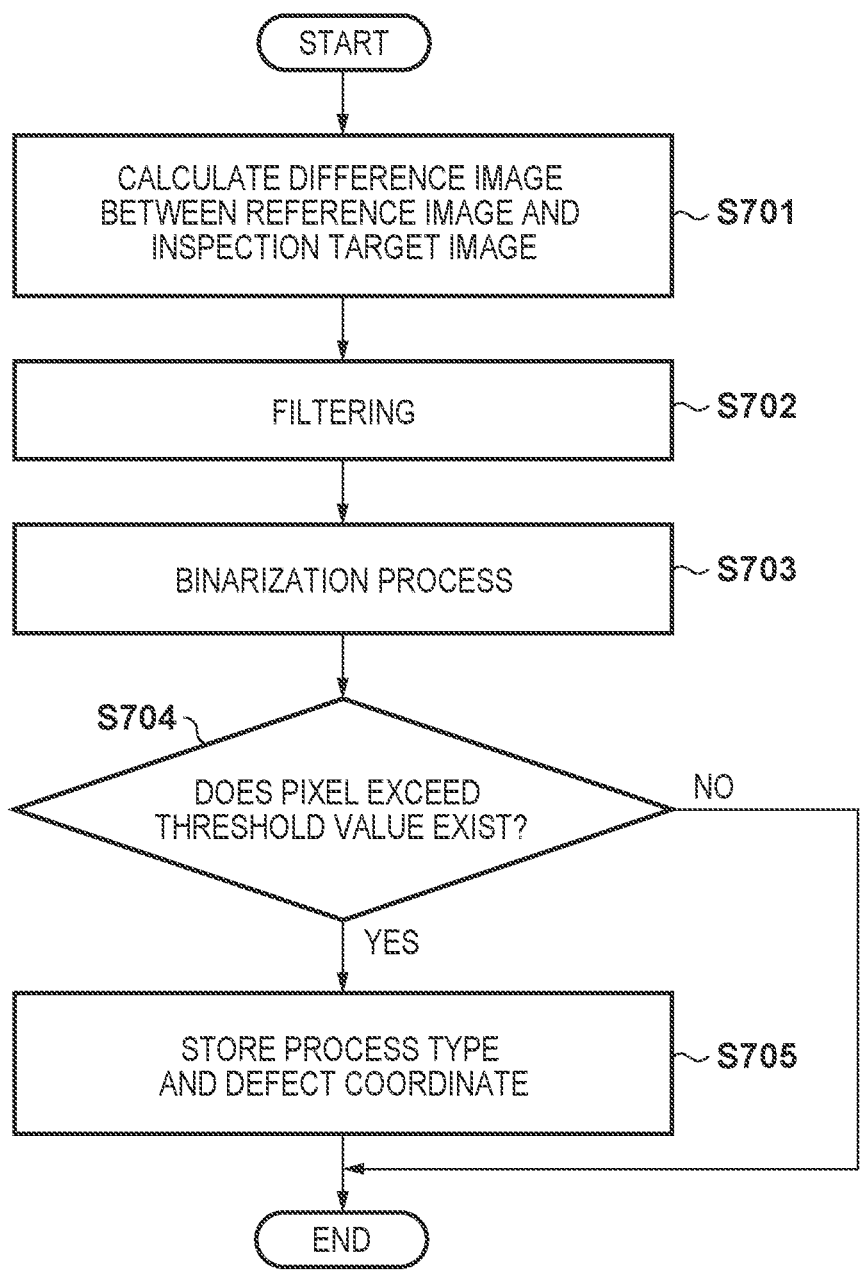

INSPECTION APPARATUS, CONTROL METHOD THEREOF, AND STORAGE MEDIUM

BACKGROUND OF THE INVENTION

Field of the Invention

The present invention relates to an inspection apparatus, a control method thereof, and a storage medium.

Description of the Related Art

In a printed matter output from a printing apparatus, dirt such as adhesion of a coloring material such as ink or toner to an unintended part may occur. Alternatively, a sufficient coloring material may not adhere to a part where an image is to be formed, and color loss in which the color becomes lighter than the original color may occur. In order to guarantee the quality of printed matter, defect inspection of printed matter such as dirt and color loss is performed.

For example, in an inspection system that automatically performs inspection, there is a method in which an image to be printed and output is read by a scanner and compared with a reference image (reference image) to perform inspection. In a case where image inspection is performed by comparing images in this manner, since image alignment greatly affects the accuracy of the inspection, it is important to perform alignment with high accuracy. RIP data that is bitmap data generated from print data can be used as the reference image. Since the RIP data of the reference image can be automatically generated from the print data, there is an advantage in variable printing in which data different for each part is printed. On the other hand, since local distortion (partial magnification variation) due to conveyance unevenness or sheet elongation occurs in the inspection target image read by the scanner, it is necessary to perform alignment including the distortion with respect to RIP data that is not distorted at all.

As a general alignment technology, it is known to extract feature points from an image and perform alignment by affine transformation or the like. However, in the alignment by the rigid body transformation, it is not possible to align a local positional displacement due to conveyance unevenness or sheet elongation. On the other hand, non-rigid body alignment using free form deformations (FEDs) is known as a more accurate alignment technology. By using the non-rigid body alignment, it is possible to perform alignment including not only image displacement and rotation but also local magnification and positional displacement. For this reason, the alignment using the free form deformation enables more accurate alignment as compared with the alignment by the rigid body transformation.

In alignment using free form deformation, a plurality of control points that control the shape of an image are arranged in a grid form on the image, and each control point is moved to perform deformation of the image. More specifically, in order to perform deformation for aligning the inspection target image with the reference image, an error of the image is calculated, and the position of the control point is sequentially updated in a direction in which the error is minimized. However, even in alignment using free form deformation, optimization cannot be performed when the positional displacement is large, and the update position of the control point may not be obtained. Japanese Patent Laid-Open No. 2014-117841 proposes a method of calculating distortion information using a distortion correction chart or the like and correcting a position using the same.

However, the above-described known technology described above has a problem described below. For example, in the above-described known technology, a large tendency of distortion can be corrected using the distortion information. However, due to the influence of different conditions for each sheet, such as a change in fixing temperature at the time of image formation and the moisture content of the sheet, slight variation in distortion occurs for each sheet printing even in the same printing machine, reading device, and type of sheet. Therefore, in the above-described known technology of correcting the position with the distortion information, it is not possible to cope with fluctuation in individual distortion for each sheet.

SUMMARY OF THE INVENTION

The present invention enables realization of a mechanism for correcting variation in distortion of an inspection target image read for each sheet and improving alignment accuracy between the inspection target image and a reference image.

One aspect of the present invention provides an inspection apparatus comprising: a reading unit configured to read a document; at least one memory device that stores a set of instructions; and at least one processor that executes the set of instructions to compare a read image obtained by the reading unit reading a chart printed by a printing apparatus with a reference image serving as a correct image of the chart to generate distortion information when reading by the reading unit, correct, using the generated distortion information, an inspection target image obtained by the reading unit reading a printed matter from the printing apparatus, align the corrected first corrected image with a reference image of the printed matter, and compare a second corrected image, on which the alignment has been performed, with a reference image of the printed matter to inspect defect of the printed matter.

Another aspect of the present invention provides a control method of an inspection apparatus including a reading unit configured to read a document, the control method comprising: comparing a read image obtained by the reading unit reading a chart including a mark for acquiring distortion information printed by a printing apparatus and a reference image serving as a correct image of the chart, and generating distortion information when reading by the reading unit; and correcting, using the generated distortion information, an inspection target image obtained by the reading unit reading a printed matter from the printing apparatus; aligning the first corrected image corrected in the correcting with a reference image of the printed matter; and comparing a second corrected image aligned in the aligning with a reference image of the printed matter to inspect a defect of the printed matter.

Still another aspect of the present invention provides a non-transitory computer-readable storage medium storing a computer program for causing a computer to execute each step in a control method of an inspection apparatus including a reading unit configured to read a document, wherein the control method comprises: comparing a read image obtained by the reading unit reading a chart including a mark for acquiring distortion information printed by a printing apparatus and a reference image serving as a correct image of the chart, and generating distortion information when reading by the reading unit; correcting, using the generated distortion information, an inspection target image obtained by the reading unit reading a printed matter from the printing apparatus; aligning the first corrected image corrected in the correcting with a reference image of the printed matter; and comparing a second corrected image aligned in the aligning with a reference image of the printed matter to inspect a defect of the printed matter.

Further features of the present invention will be apparent from the following description of exemplary embodiments with reference to the attached drawings.

BRIEF DESCRIPTION OF THE DRAWINGS

FIG. 7 is a flowchart illustrating a procedure of a defect detection process according to one embodiment;

DESCRIPTION OF THE EMBODIMENTS

Figure 1:
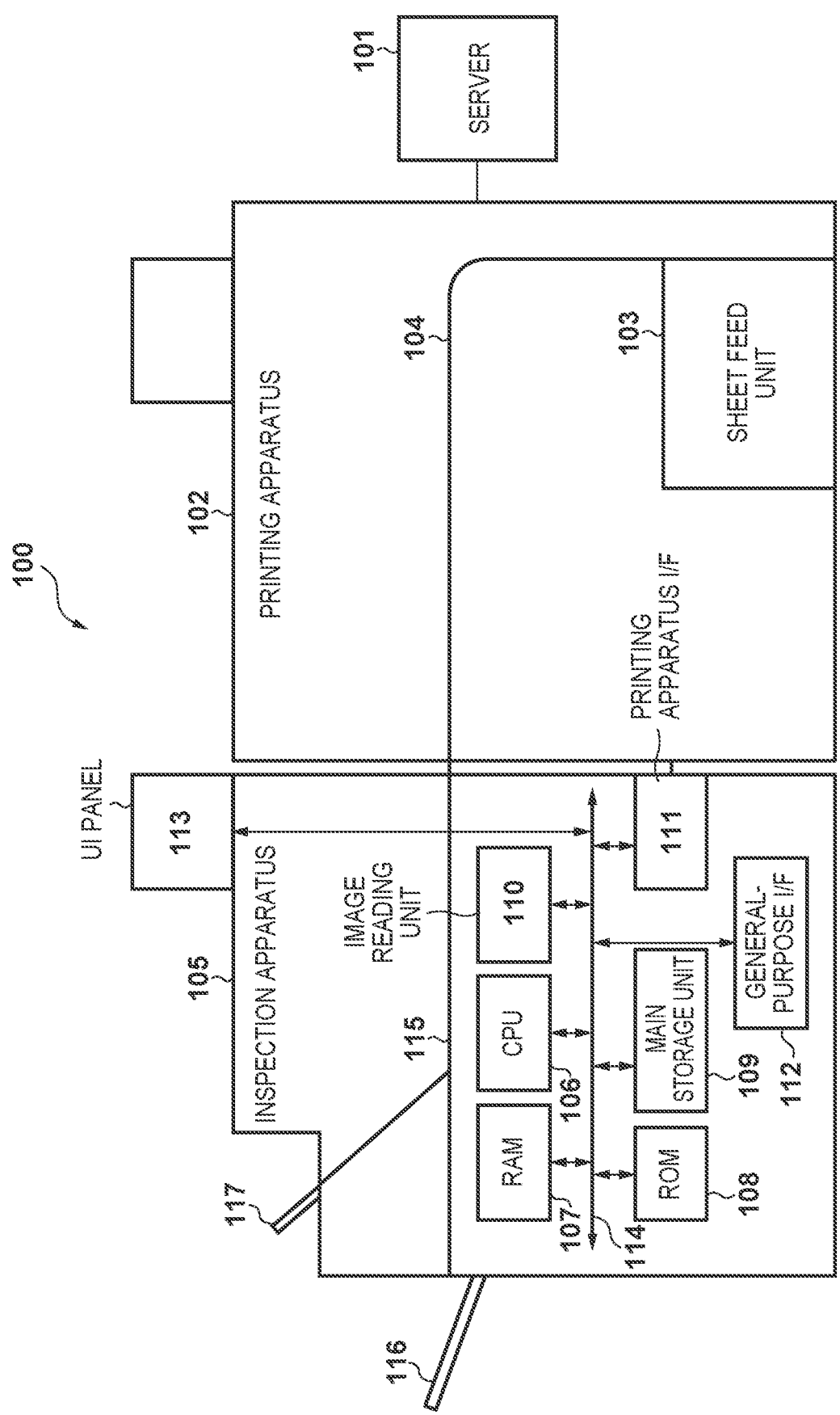
FIG. 1 is a diagram illustrating a configuration of an inspection system including an inspection apparatus according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Configuration of Inspection System>

One embodiment of the present invention will be described below with reference to the drawings. First, referring to FIG. 1, a configuration example of an inspection system 100 including an inspection apparatus 105 according to one embodiment of the present invention will be described. The inspection system 100 includes a server 101, a printing apparatus 102, and an inspection apparatus 105. In the inspection system 100, the printing apparatus 102 outputs a printed matter based on print job data generated by the server 101, and the inspection apparatus 105 inspects presence of absence of defect in the printed matter.

The server 101 generates the print job data and transmits the generated print job data to the printing apparatus 102. A plurality of external devices (not shown) are connected to the server 101 via a network so as to be communicable with each other. The server 101 receives a request for generating print job data and the like from these external devices.

The printing apparatus 102 forms an image on a sheet based on the print job data received from the server 101. In the present embodiment, a configuration in which the printing apparatus 102 uses the electrophotographic method will be described, but the present invention is not limited to this configuration, and a configuration in which the printing apparatus 102 uses another printing method such as an offset printing method or an inkjet method may be adopted. The printing apparatus 102 includes a sheet feed unit 103. Sheets are set in advance in the sheet feed unit 103 by a user. The printing apparatus 102 conveys the sheet set in the sheet feed unit 103 along a conveying path 104 based on the print job data received from the server 101, forms an image on one side or both sides of the sheet, and outputs a printed matter on which the image is formed to the inspection apparatus 105. The conveying path 104 leads to a conveying path 115 of the inspection apparatus 105, and the printed matter output from the printing apparatus 102 is conveyed into the inspection apparatus 105 as it is. Note that there is no intention to limit the present invention, and a form in which the user places the printed matter output to a sheet discharge tray by the printing apparatus 102 on the inspection apparatus 105 may be adopted.

The inspection apparatus 105 includes a CPU 106, a RAM 107, a ROM 108, a main storage unit 109, an image reading unit 110, a printing apparatus I/F 111, a general-purpose I/F 112, and a UI panel 113. The CPU 106, the RAM 107, the ROM 108, the main storage unit 109, the image reading unit 110, the printing apparatus I/F 111, the general-purpose I/F 112, and the UI panel 113 are connected to each other by way of a main bus 114. The inspection apparatus 105 also includes a conveying path 115 connected to the conveying path 104 of the printing apparatus 102, an output tray 116, and an output tray 117.

The CPU 106 is a processor that controls the entire inspection apparatus 105. The RAM 107 functions as a main memory, a work area, or the like of the CPU 106. The ROM 108 stores a plurality of programs executed by the CPU 106. The main storage unit 109 stores an application executed by the CPU 106, data used for image processing, and the like.

The image reading unit 110 reads one side or both sides of a printed matter to be inspected output from the printing apparatus 102 and generates a scan image (read image) of the printed matter. Specifically, the image reading unit 110 reads one side or both sides of the conveyed printed matter using one or more reading sensors (not illustrated) provided in the vicinity of the conveying path 115. The reading sensor may be provided only on one surface side, or may be provided on both the front surface side and the back surface side of the printed matter to be conveyed in order to simultaneously read both sides. In the configuration in which the reading sensor is provided only on one side of the printed matter, the printed matter obtained by reading one side is conveyed to a double-sided conveying path (not illustrated) in the conveying path 115, the front and back sides of the printed matter are reversed, and the reading sensor reads the other side.

The printing apparatus I/F 111 is connected to the printing apparatus 102, synchronizes the processing timing of the printed matter with the printing apparatus 102, and notifies each other of the operating statuses. The general-purpose I/F 112 is a serial bus interface such as USB or IEEE 1394. For example, by connecting a USB memory to the general-purpose I/F 112, data such as a log stored in the main storage unit 109 can be written to the USB memory and taken out, or data stored in the USB memory can be taken into the inspection apparatus 105.

The UI panel 113 is, for example, a liquid crystal display (display unit). The UI panel 113 functions as a user interface of the inspection apparatus 105, and displays the current status and settings to notify the user. Furthermore, the UI panel 113 is a liquid crystal display of a touch panel, and can receive an instruction from the user by the user operating the displayed button.

In the inspection apparatus 105, the image reading unit 110 reads the printed matter output from the printing apparatus 102 to generate a scan image of the printed matter. Furthermore, a distortion information generating module 203 to be described later generates distortion information by comparing a scan image generated by reading a distortion correction chart (hereinafter referred to as a "chart") by the image reading unit 110, and a reference image generated as a correct image of the chart. Furthermore, an image inspection module 206 to be described later inspects for a presence or absence of a defect in the printed matter by comparing a scan image generated by reading an image (hereinafter referred to as "inspection target image") to be inspected by the image reading unit 110, and a reference image registered in advance as a correct image. Here, the defect in the printed matter is that which lowers the quality of the printed matter, such as dirt in which a coloring material such as ink or toner adheres to an unintended part, color loss in which a sufficient coloring material does not adhere to a part where an image is to be formed and the color becomes lighter than original, and the like. The inspection apparatus 105 outputs the printed matter that has passed the inspection to the output tray 116, and outputs the printed matter that has not passed the inspection to the output tray 117. In this way, it is possible to collect only the printed matter guaranteed to have a certain quality on the output tray 116 as a product for delivery.

<Configuration of Software Module>

Figure 2:
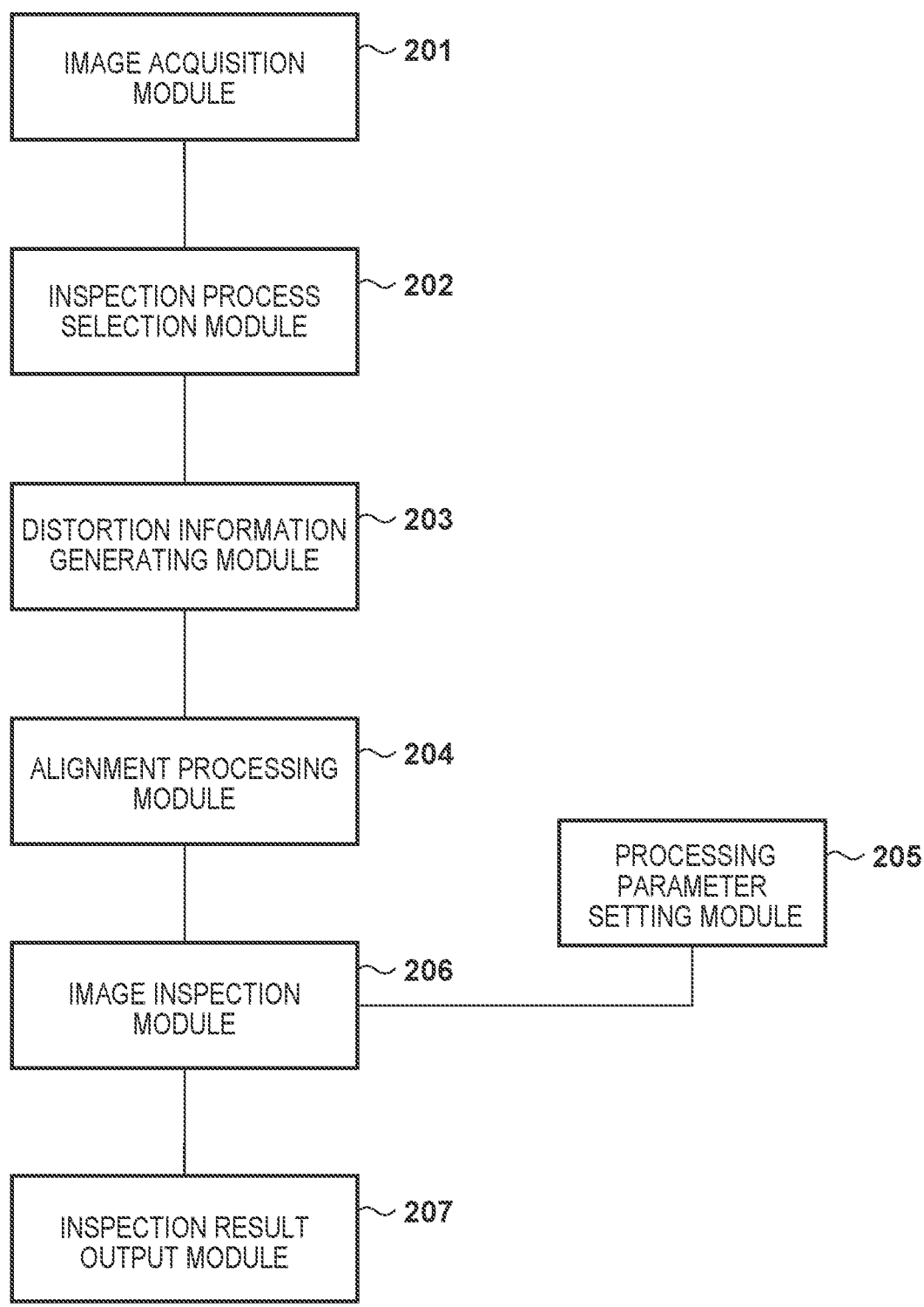
FIG. 2 is a block diagram schematically illustrating a configuration of a software module of the inspection apparatus according to one embodiment.

Next, a configuration example of a software module of the inspection apparatus 105 according to the present embodiment will be described with reference to FIG. 2. The inspection apparatus 105 includes, as software modules, an image acquisition module 201, an inspection process selection module 202, a distortion information generating module 203, and an alignment processing module 204 in FIG. 2. In addition, the inspection apparatus 105 includes a processing parameter setting module 205, an image inspection module 206, and an inspection result output module 207. The process by each module is realized when the CPU 106 reads out a program stored in the ROM 108 into the RAM 107 and executes the program.

The image acquisition module 201 acquires an inspection target image and a scan image of a chart from the image reading unit 110. The image acquisition module 201 acquires a reference image registered in advance as a correct image from the RAM 107 or the main storage unit 109. The inspection process selection module 202 selects a defect detection process based on information input to a selection screen (not shown) displayed on the UI panel 113 by the user. In this selection screen, the type of sheet to be used for printing, the sheet size, and double-sided printing or one-sided printing are selected. In addition, for example, the type of defect is selected. The inspection process selection module 202 selects a defect detection process for detecting a selected type of defect from a plurality of defect detection processes executable by the image inspection module 206. The type of defect may be a point-shaped defect and a line-shaped (streak) defect. Note that the types of defect are not limited to these, and may include any type of defect such as image unevenness or defect in the surface shape. When the type of defect is not selected by the user, the inspection process selection module 202 selects the defect detection process set by default.

Figure 11:
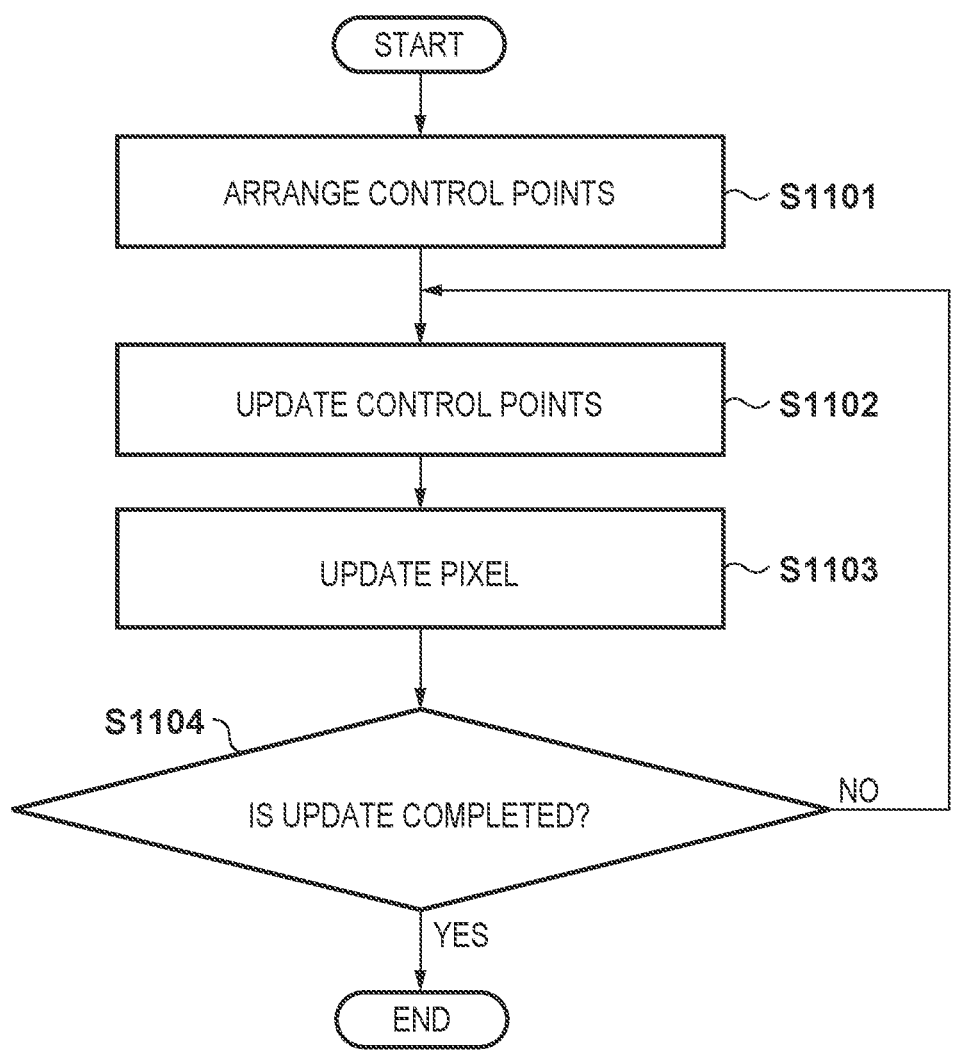
FIG. 11 is a flowchart illustrating a procedure of a second distortion correcting process according to one embodiment.

The distortion information generating module 203 executes distortion information generating process of generating distortion information from the scan image of the chart and the reference image. Details of the distortion information generating process will be described later with reference to FIG. 5. The alignment processing module 204 executes alignment process in FIGS. 9 and 11, which will be described later, for aligning the inspection target image and the reference image. The processing parameter setting module 205 sets a parameter to be used in the defect detection process selected by the inspection process selection module 202. The parameter includes a filter for emphasizing the defect of the type selected by the user and a defect determination threshold value for determining a defect. The image inspection module 206 executes the defect detection process selected by the inspection process selection module 202. The inspection result output module 207 displays the inspection result on the UI panel 113. The inspection result output module 207 may also generate a report indicating the inspection result, and transmit and output the report to an external device. Furthermore, the inspection result may be output by the printing apparatus 102.

<Processing Procedure of Inspection Process>

Figure 3:
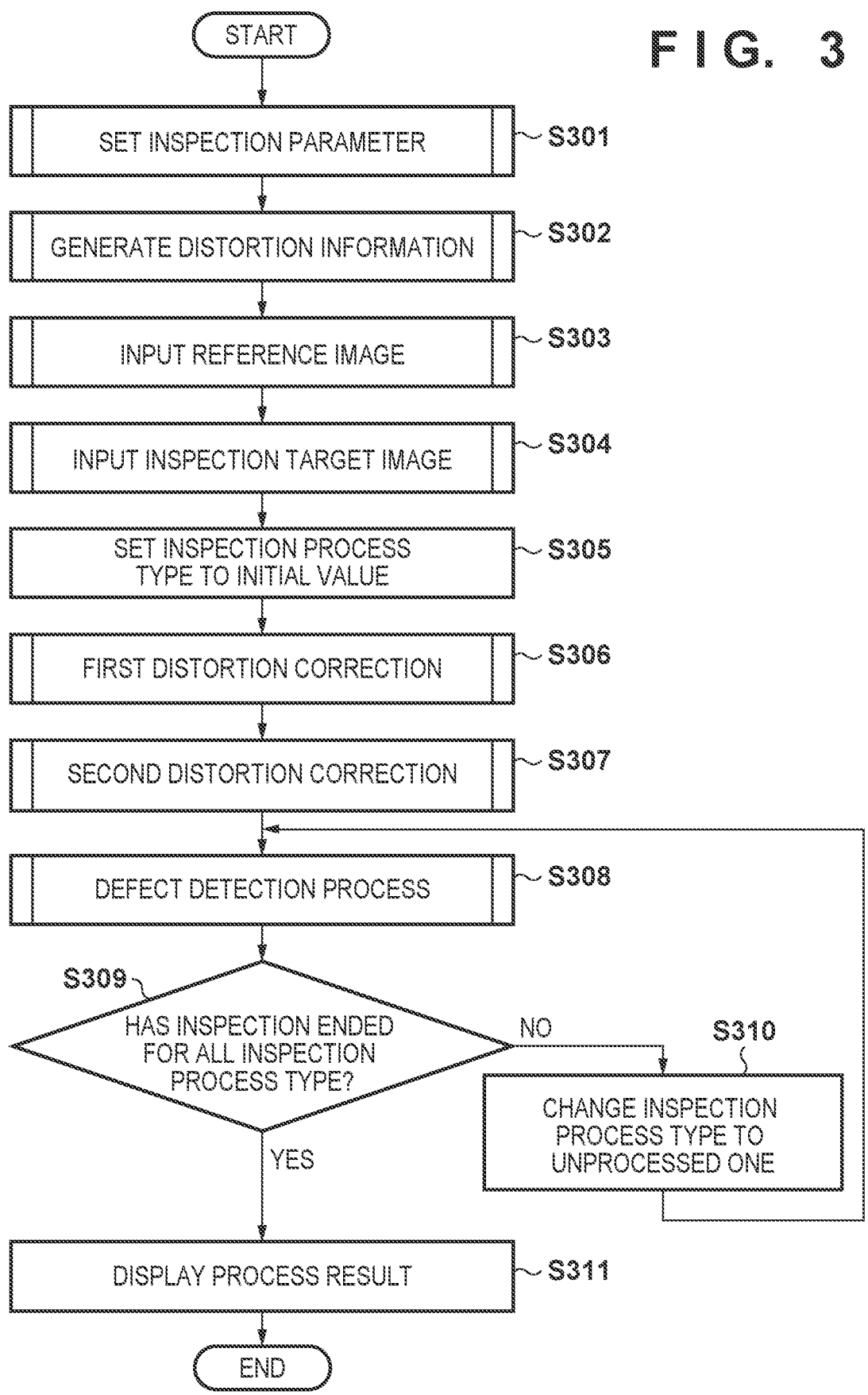
FIG. 3 is a flowchart illustrating a procedure of an inspection process executed by the inspection apparatus according to one embodiment.

Next, a processing procedure for the inspection process executed by the inspection apparatus 105 according to the present embodiment will be described with reference to FIG. 3. The process explained below is realized, for example, when the CPU 106 reads out a program stored in the ROM 108 into the RAM 107 and executes the program.

First, in S301, the CPU 106 performs inspection setting necessary for inspection of the inspection target image based on the information input to the selection screen displayed on the UI panel 113 by the user. For example, here, the inspection process selection module 202 selects one or more defect detection processes based on one or more types of defect selected by the user. In addition, the processing parameter setting module 205 sets a parameter to be used in each defect detection process selected by the inspection process selection module 202.

Figure 5:
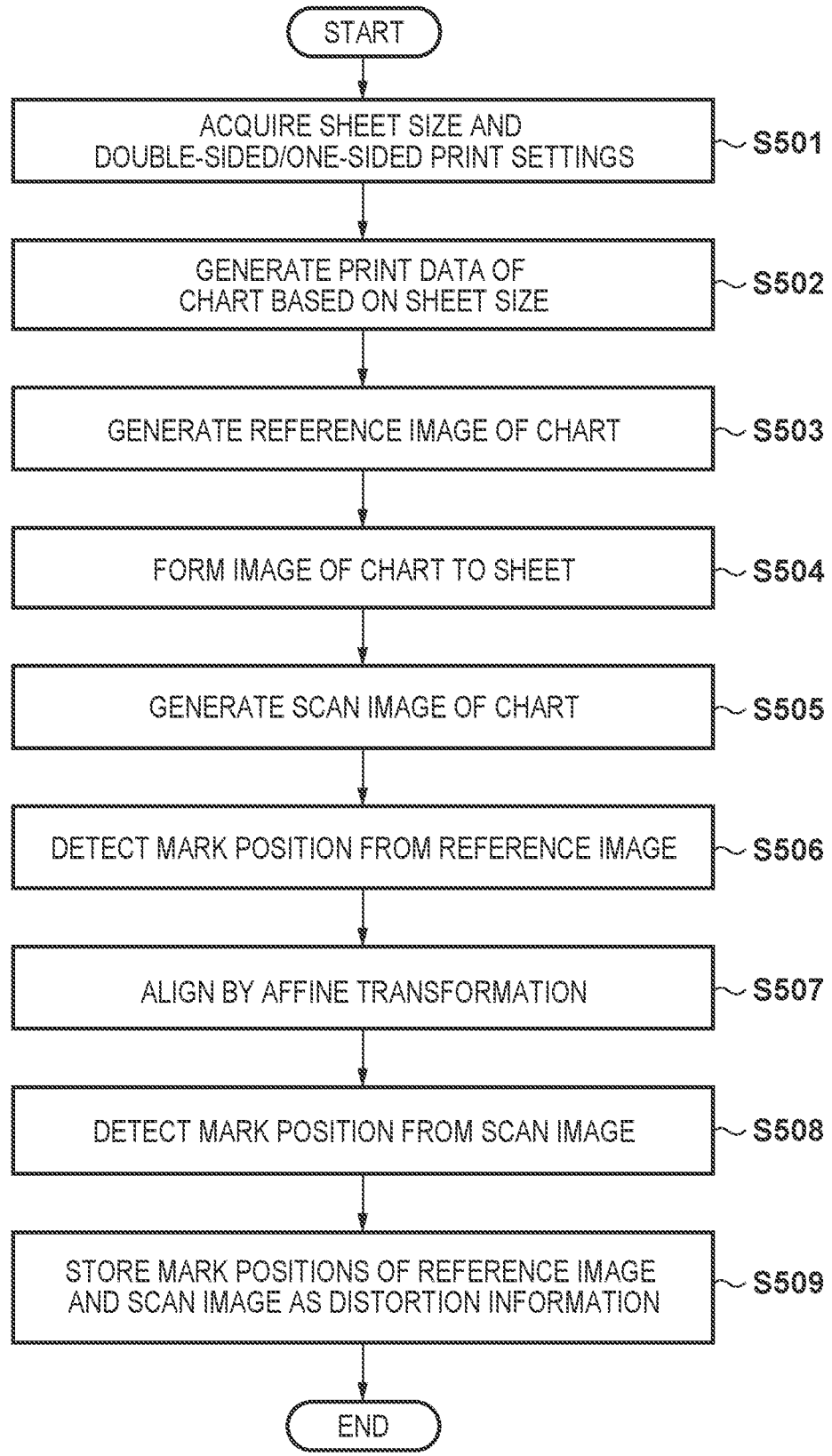
FIG. 5 is a flowchart illustrating a procedure of distortion information generating process according to one embodiment.

Next, in S302, the CPU 106 causes the distortion information generating module 203 to generate distortion information of FIG. 5 described later. Subsequently, in S303, the CPU 106 causes the image acquisition module 201 to acquire the registered reference image from the RAM 107 or the main storage unit 109. However, the reference image is registered before the inspection process is performed. As a registration method, for example, print job data transmitted from the server 101 is taken in through the printing apparatus I/F 111 and stored in the RAM 107 or the main storage unit 109. Furthermore, in step S304, the CPU 106 causes the image acquisition module 201 to acquire the inspection target image from the image reading unit 110. The inspection target image generated in advance by the image reading unit 110 and stored in the main storage unit 109 may be acquired in S304.

Next, in S305, the CPU 106 sets one defect detection process to be executed from the one or more defect detection processes selected by the inspection process selection module 202. Here, for example, a defect detection process registered in advance to be preferentially executed or a defect detection process corresponding to the type of defect initially selected by the user is set. Subsequently, in S306, the CPU 106 causes the alignment processing module 204 to execute a first distortion correcting process of FIG. 9 to be described later, and further execute a second distortion correcting process of FIG. 11 in S307 to align the inspection target image and the reference image.

Next, in S308, the CPU 106 executes a defect detection process of FIG. 7 to be described later. Subsequently, in S309, the CPU 106 determines whether or not the execution of all the selected defect detection processes has ended. When it is determined that the execution of any of the selected defect detection processes is not to be ended, the process proceeds to S310, and the CPU 106 sets one defect detection process to be executed from the unexecuted defect detection processes, and returns the process to S308.

On the other hand, when it is determined in S309 that the execution of all the selected defect detection processes has ended, the process proceeds to S311, and the CPU 106 causes the inspection result output module 207 to display a result display screen 401 to be described later on the UI panel 113, and ends the process of this flowchart.

<Result Display Screen>

Figure 4:
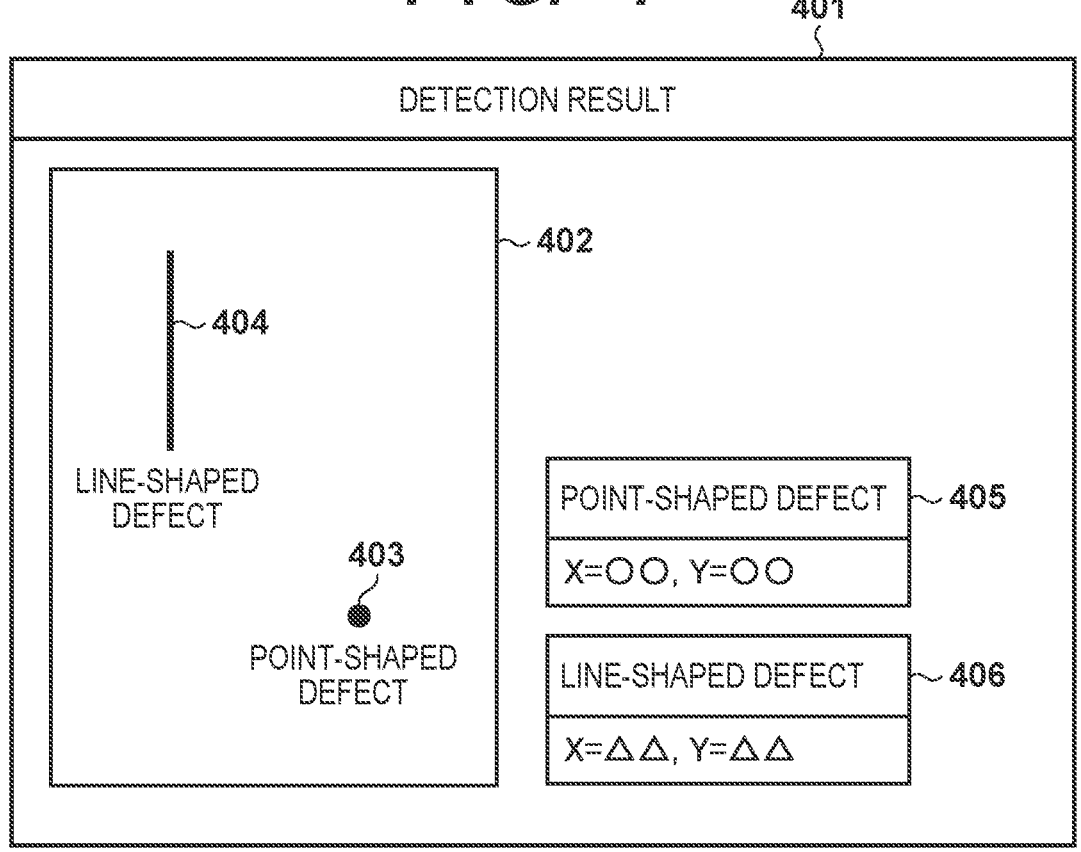
FIG. 4 is a diagram illustrating an example of a result display screen displayed on a UI panel according to one embodiment.

The result display screen 401 displayed in S311 according to the present embodiment will be described with reference to FIG. 4. The result display screen 401 is configured to include an inspection target image 402 and coordinate information 405 and 406. Note that here, the inspection target image 402 includes defects 403 and 404. In addition, characters of "point-shaped defect" are displayed in the vicinity of the defect 403 determined as the point-shaped defect. In addition, characters "line-shaped defect" are displayed in the vicinity of the defect 404 determined as the line-shaped defect.

The coordinates of each defect in the inspection target image 402 are displayed in the coordinate information 405 and 406. The coordinate information 405 indicates the coordinates of the defect 403 that is a point-like defect in the inspection target image 402. In the coordinate information 406, coordinates of the defect 404 which is a line-shaped defect in the inspection target image 402 are displayed. Note that the display method of the inspection result is not limited to the above-described method, and for example, any display method may be used as long as the user can recognize by which of a plurality of defect detection processes the detected defect is detected, such as displaying in different colors for each type of defect.

<Distortion Information Generating Process>

Next, a detailed processing procedure of the distortion information generating process in S302 described above will be described with reference to FIG. 5. The process explained below is realized, for example, when the CPU 106 reads out a program stored in the ROM 108 into the RAM 107 and executes the program.

Figure 6:
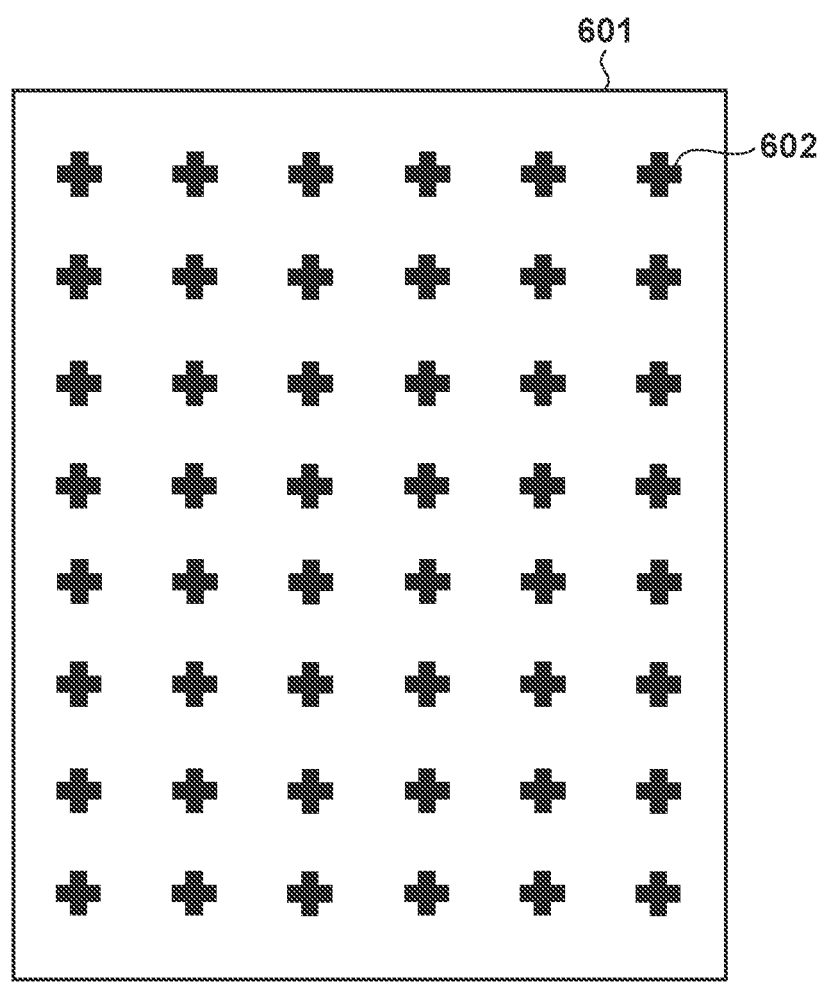
FIG. 6 is a diagram illustrating an example of a chart generated in S502.

First, in S501, the distortion information generating module 203 acquires the type of sheet to be used for printing, the sheet size, and the double-sided/one-sided print settings (whether double-sided printing is performed or not) selected in the inspection process selection module 202. Note that the type of sheet may indicate sheets having different basis weights, for example, plain sheet and thick sheet. In this case, sheets having the same basis weight are regarded as the same type. Subsequently, in S502, the distortion information generating module 203 generates print date of a distortion correction chart 601 as shown in FIG. 6 in accordance with the sheet size. In the chart 601, marks 602 are arranged in a grid form on the entire surface of the sheet. When the interval between the marks 602 is reduced, more accurate distortion information can be acquired. The number of marks 602 may be changed according to the sheet size. In addition, in FIG. 6, a cross shape is used as the shape of the mark, but there is no intention to limit the present invention to this shape, and for example, a quadrangular shape such as a square shape may be used.

Next, in S503, the distortion information generating module 203 generates a reference image from the generated chart print data. The reference image generated here is a correct image to be compared with the read image of the chart. Subsequently, in S504, the CPU 106 transmits the generated chart print data to the printing apparatus 102 through the printing apparatus I/F 111. In the printing apparatus 102, a sheet corresponding to the sheet type and size acquired in S501 is fed from the sheet feed unit 103, and an image is formed according to the received print data. In the case of the double-sided printing setting, images are formed on both sides of the sheet. Then in S505, the CPU 106 generates the scan image of the chart obtained by the image reading unit 110 reading the printed matter on which the image of the chart is formed conveyed from the printing apparatus 102.

Next, in S506, the distortion information generating module 203 detects a mark position from the reference image of the chart generated in S503. The method of detecting the mark position is not particularly limited, but for example, there is a method of extracting a pixel region of the mark by template matching, and acquiring the center of gravity of the pixel region to use it as the mark position. At this time, an index indicating that the mark is at j-th row i-th column from the upper left of the sheet is simultaneously acquired based on the position of the mark so that each mark can be identified. Subsequently, in S507, the distortion information generating module 203 aligns the scan image of the chart generated in S505 with the reference image by affine transformation. The alignment method may be, for example, an alignment method of acquiring an affine matrix such that the sum of Euclidean distances of the mark positions is minimized to perform affine transformation. Since the affine transformation is a deformation that rotates, translates, scales, and shears the entire image, the scan image can be aligned with the reference image while maintaining local distortion in the image. In the case of double-sided printing, alignment is performed on each of the front surface and the back surface.

Next, in S508, the distortion information generating module 203 detects a mark position and acquires an index of a mark through a method similar to S506 from the scan image aligned in S507. In the case of double-sided printing, process is performed on each of the front surface and the back surface. Subsequently, in S509, the distortion information generating module 203 stores the positions and indexes of the marks of the reference image and the aligned scan image acquired in each of S506 and S508 in the main storage unit 109 as distortion information, and ends the process of this flowchart.

<Defect Detection Process>

Next, a detailed processing procedure of the defect detection process in S306 will be described with reference to FIG. 7. The process explained below is realized, for example, when the CPU 106 reads out a program stored in the ROM 108 into the RAM 107 and executes the program.

First, in S701, the image inspection module 206 generates a difference image by comparing the aligned inspection target image and the reference image using the generated distortion information. The difference image is, for example, an image generated by comparing the reference image and the inspection target image for each pixel and acquiring a pixel value, for example, a difference value of a density value for each RGB for each pixel. The method of obtaining the difference may be changed according to the type of the defect detection process set in S305 or S310.

Figure 8A:
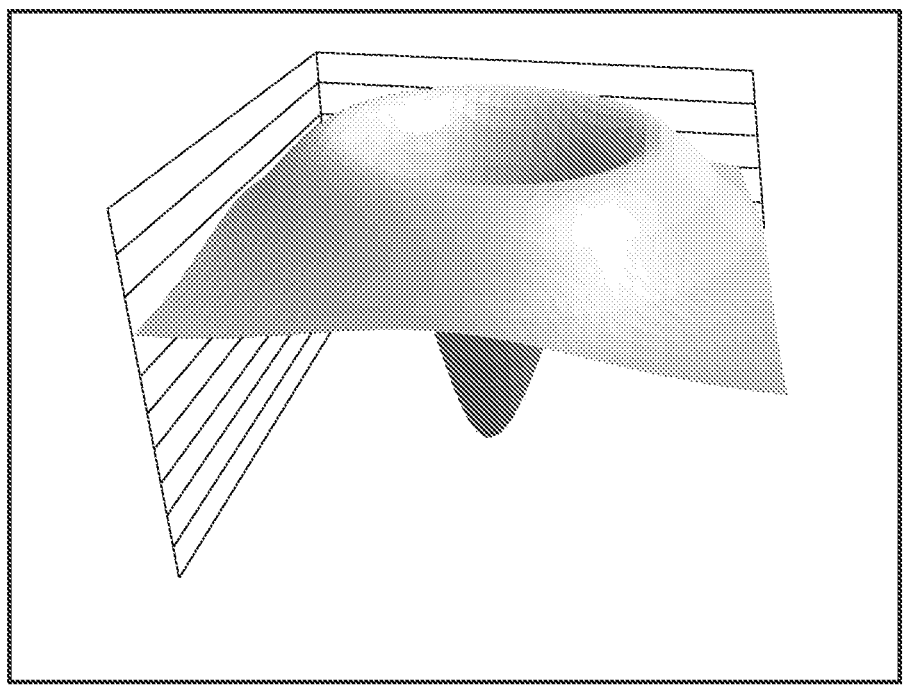
FIGS. 8A and 8B are diagrams illustrating an example of a filter used in S702.
Figure 8B:
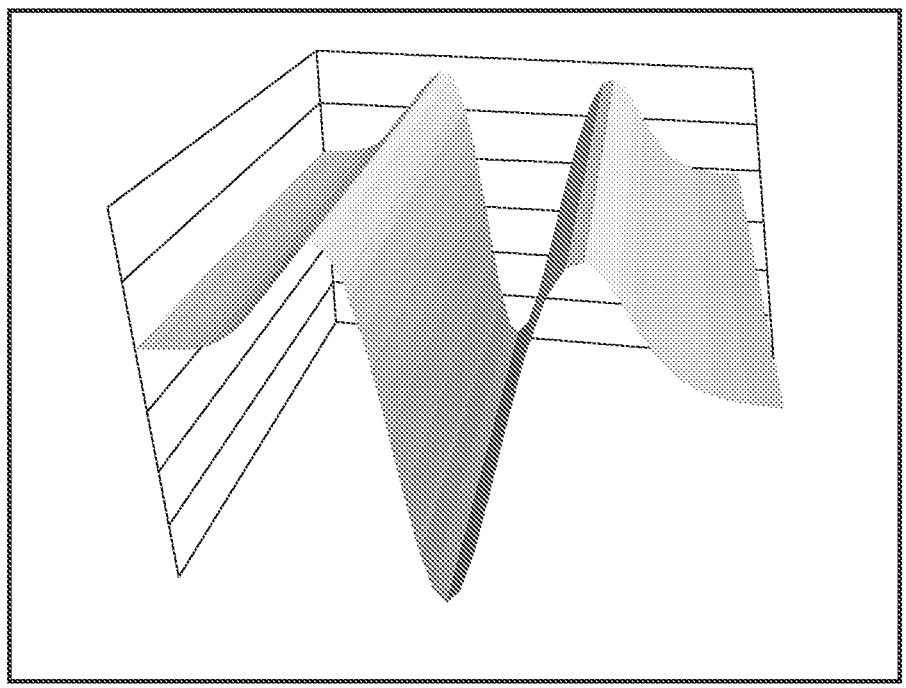

Next, in S702, the image inspection module 206 executes filtering for emphasizing a specific shape on the difference image. For example, FIG. 8A is a filter for emphasizing a point-shaped defect, and FIG. 8B is a filter for emphasizing a line-shaped defect. These filters are changed according to the type of the defect detection process set in S305 or S310. For example, when the defect detection process set in S305 or S310 is a defect detection process for detecting a point-shaped defect, the filtering of S702 is executed using the filter of FIG. 8A. On the other hand, when the defect detection process set in S305 or S310 is a defect detection process for detecting a line-shaped defect, the filtering of S702 is executed using the filter of FIG. 8B.

Next, in S703, the image inspection module 206 executes binarization process on the filtered difference image. As a result, an image in which a pixel value of a pixel having a difference value exceeding the defect determination threshold value is set to "1" and a pixel value of a pixel having a difference value less than or equal to the defect determination threshold value is set to "0" (hereinafter referred to as a "differential binarized image") Is generated. Subsequently, in S704, the image inspection module 206 determines whether or not a pixel exceeding the defect determination threshold value exists by using the differential binarized image. In a case where it is determined that a pixel exceeding the defect determination threshold value does not exist, it is determined that there is no defective part, and the process of this flowchart is ended.

On the other hand, in a case where it is determined in S704 that a pixel exceeding the defect determination threshold value exists, the process proceeds to S705, and the image inspection module 206 stores information regarding the detected defect in the RAM 107 or the main storage unit 109, and ends the process of this flowchart. Specifically, the image inspection module 206 stores the type of the defect detection process in which the defective part is detected and the coordinates of the defective part in the RAM 107 and the main storage unit 109 in association with each other.

The defect detection process of FIG. 7 is a subroutine of S308 and illustrates a flow of one defect detection process. Therefore, every time the subroutine of S308 is called out, the defect detection process of the selected type is executed. In S702, the filtering is executed using the filter corresponding to the defect detection process of the selected type.

In the present embodiment, the defect detection process of detecting a point-shaped defect and the defect detection process of detecting a line-shaped defect have been described as examples of the defect detection process, but the types of the defect detection process are not limited thereto. That is, the present invention can be applied to any defect detection process as long as the defect detection process enables the user to detect a desired defect, and the type of the defect detection process is not limited.

<First Distortion Correcting Process>

Next, a detailed processing procedure of the first distortion correcting process in S306 described above will be described with reference to FIG. 9. In the first distortion correcting process, a large tendency of distortion is corrected using the distortion information generated in S302 described above. As an image deformation method for correcting local distortion such as partial magnification variation, for example, free form deformation (FFD) can be used. In addition, a thin plate spline (TPS) method, a landmark large deformation diffeomorphic metric mapping (LDDMM) method, or the like may be used. In the present embodiment, a method using the free form deformation will be described. Hereinafter, the reference image is indicated by T, the inspection target image is indicated by I, and the inspection target image subjected to the first distortion correcting process is indicated by a first distortion corrected image (first corrected image) I'. T(x, y), I(x, y), and I'(x, y) each represents a pixel value at the coordinates (x, y). The process explained below is realized, for example, when the CPU 106 reads out a program stored in the ROM 108 into the RAM 107 and executes the program.

First, in S901, the alignment processing module 204 performs pre-alignment. Here, for example, an alignment method of extracting feature points from an image, and acquiring an affine matrix so that the sum of Euclidean distances of the feature points is minimized to perform affine transformation may be adopted. Subsequently, in S902, the alignment processing module 204 acquires the distortion information generated in S302 from the main storage unit 109.

Next, in S903, the alignment processing module 204 arranges a control point (first control point) based on the acquired distortion information. Here, the alignment processing module 204 arranges L×M control points in the vertical and horizontal directions in a grid form on the inspection target image I (scan image of printed matter). The number of control points is desirably greater than the number of marks in the chart 601 in order to increase the accuracy of distortion correction. In addition, the coordinates of the control points in the 1-th row and the m-th column are $p_{m,l}$ (l=1, ..., L, m=1, ..., M).

Here, a deformation equation for generating the first distortion corrected image I' from the inspection target image I is expressed by the following equation (1). w(x, y) is expressed by the following equation (2), and is an equation for acquiring the coordinates after distortion correction of the coordinates (x, y) in the inspection target image I. The bases $B_0(t)$, BM), $B_2(t)$, and $B_3(t)$ in the following equation (2) are expressed by the following equations (3) to (6), respectively. In addition, u and v are expressed by the following equations (7) and (8), respectively. δx and δy are expressed by the following equations (9) and (10), respectively. Here, H and W are the vertical size and the horizontal size of the image, respectively.

[Equation 1]

$$I'(x,y)=I(w(x,y)) \tag{1}$$

$$W(x,y)=\Sigma_{i=0}^{3}\Sigma_{j=0}^{3}B_i(u)B_j(v)p_{u+i,v+j} \tag{2}$$

$$B_0(t)=(1-t)^3/6 \tag{3}$$

$$B_1(t)=(3t^3-6t^2+4)/6 \quad (4)$$

$$B_2(t)=(-3t^3+3t^2+3t+1)/6 \quad (5)$$

$$B_3(t)=t^3/6 \quad (6)$$

$$u=\lfloor x/\delta_x \rfloor -1 \quad (7)$$

$$u=\lfloor y/\delta_y \rfloor -1 \quad (8)$$

$$\delta_x(t)=W/(M-1) \quad (9)$$

$$\delta_y(t)=H/(L-1) \quad (10)$$

Figure 10:
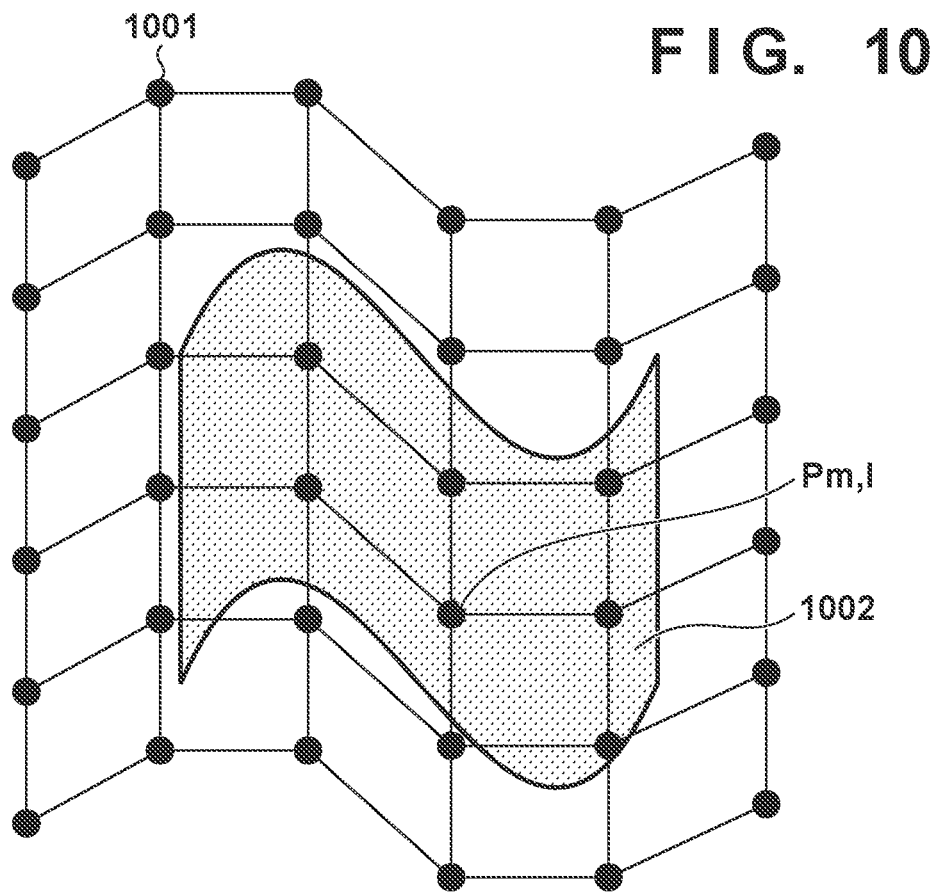
FIG. 10 is a schematic diagram illustrating a state in which control points are arranged at optimal coordinates in S903.

FIG. 10 is a schematic diagram illustrating a state in which control points 1001 are arranged at optimal coordinates along the distortion of the image 1002. In S903, the optimal coordinates $p_{m,1}$ (l=1, . . . , L, m=1, . . . , M) of the control points are acquired using the distortion information. As an acquisition method, for example, the control point coordinates can be analytically acquired by a least squares method. That is, the correspondence of the mark positions of the scan image and the reference image of the chart 601 is regarded as the correspondence of the feature points of the inspection target image and the reference image, and the control point coordinates that minimize the deviation of the mark positions when deformation according to equation (1) is performed on the chart are obtained. The sum of square errors of the mark positions is expressed by the following equation (11). In the following equation (11), the number of rows and the number of columns of the marks in the chart 601 are $L_\mu$ and $M_\mu$ respectively, and the mark positions in the index j-th row and i-th column of the reference image and the scan image in the chart 601 are $\mu_t^{(i,j)}$ and $\mu_s^{(i,j)}$, respectively. Equation (11) is differentiated by a vector having all the control point coordinates as elements. Then, a vector having all the control point coordinates as elements when the differential value is set to 0 can be acquired as the control point coordinates to be obtained.

[Equation 2]

$$E=(1/(L_\mu \times M_\mu)) \times \Sigma_{j=1}^{L_\mu} \Sigma_{i=1}^{M_\mu} \| \mu_t^{(i,j)} - w(\mu_s^{(i,j)}) \|^2 \quad (11)$$

In the present embodiment, the grid points used to derive the first distortion corrected image I' are 16 points of p(u, v), p(u+1, v), . . . , and p(u+3, v+3), but the present invention is not limited thereto. For example, four grid points having close Euclidean distances of (x, y) may be used.

Figure 9:
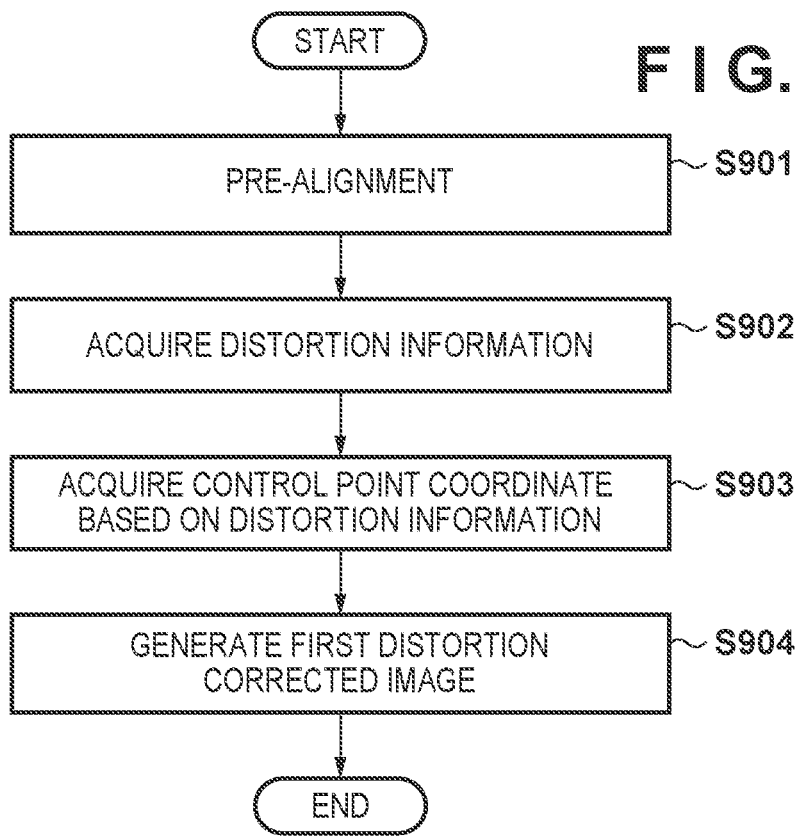
FIG. 9 is a flowchart illustrating a procedure of a first distortion correcting process according to one embodiment.

The description returns to FIG. 9. Next, in S904, the alignment processing module 204 performs deformation of the inspection target image I by equation (1) based on the control point coordinates acquired in S903 to generate a first distortion corrected image I'. The first distortion correcting process is thereby completed.

<Second Distortion Correcting Process>

Next, a detailed processing procedure of the second distortion correcting process in S307 described above will be described with reference to FIG. 11. The second distortion correcting process is to correct distortion that cannot be corrected by the first distortion correction. In the present embodiment, a method of optimizing a control point used for free form deformation based on a comparison between a reference image corresponding to an inspection target image (printed matter) and a first distortion corrected image will be described. Hereinafter, the reference image is indicated by T, the first distortion corrected image is indicated by I', and the image subjected to the second distortion correcting process is indicated by an alignment image (second corrected image) I". T(x, y), I'(x, y), and I"(x, y) each represents a pixel value at the coordinates (x, y). The process explained below is realized, for example, when the CPU 106 reads out a program stored in the ROM 108 into the RAM 107 and executes the program.

First, in S1101, the alignment processing module 204 arranges the control points (second control points). Specifically, the alignment processing module 204 arranges the L'×M' control points in the vertical and horizontal directions in a grid form on the first distortion corrected image I'. Note that the number of control points (second control points) does not need to be the same as the number L×M of control points (first control points) used in the first distortion correcting process, but is desirably as large as possible. In addition, the coordinates of the control points in the l-th row and the m-th column are $p_{m,1}$ (l=1, . . . , L', m=1, . . . , M').

Figure 12:
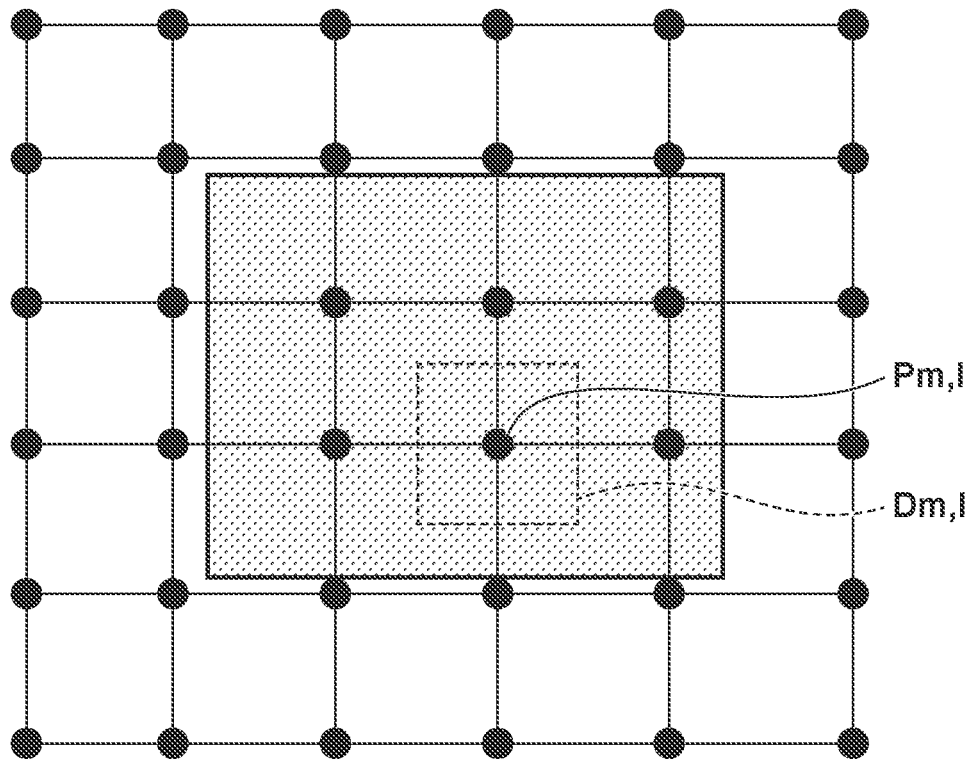
FIG. 12 is a schematic diagram for explaining an update equation in S1102.

Next, in S1102, the alignment processing module 204 updates the positions of the control points. FIG. 12 is a schematic diagram for explaining a second distortion correcting process. The update equation is shown in the following equation (12). l1 represents a weighting factor, and may be, for example, a value such as 0.1, or may be changed according to the update speed of the control point. ∇c is expressed by the following equation (13), and is a differential value of a sum of squares of the differences of the pixel values of the first distortion corrected image I' and the reference image T in a group $D_{m,1}$ of positions of pixels near the control point pro in FIG. 12.

[Equation 3]

$$P_{l,m} = P_{l,m\mu} + \mu \frac{\nabla c}{\|\nabla c\|} \quad (12)$$

$$\nabla c = \frac{\partial}{\partial p_{l,m}} \sum_{D_{l,m}} |I'(x, y) - T(x, y)|^2 \quad (13)$$

Next, in S1103, the alignment processing module 204 updates the pixel according to the update of the control point in S1102. The update is executed based on the following equation (14). Subsequently, in S1104, the alignment processing module 204 determines whether or not the update of the pixel has been completed. Here, for example, the alignment processing module 204 calculates a distance d between the alignment image I" and the reference image T, and determines whether or not the update of the pixel is completed based on the distance d. The distance d is expressed by the following equation (15).

[Equation 4]

$$I''(x, y) = I'(w(x, y)) \quad (14)$$

$$d = \frac{1}{XY} \sum_{x=1}^{X} \sum_{y=1}^{Y} |I''(x, y) - T(x, y)| \quad (15)$$

In S1104, if the distance d is less than or equal to the preset threshold value, the alignment processing module 204 determines that the update of the pixel is completed. On the other hand, if the distance d is not less than or equal to the preset threshold value, the alignment processing module 204 determines that the update of the pixel is not completed. As another determination method, there is also a method of determining an upper limit of the number of updates in advance, and determining that the update is completed when the upper limit is reached. When determined that the update of the pixel is not completed in S1104, the alignment process returns to S1102. On the other hand, when determined that the update of the pixel is completed in S1104, the alignment processing module 204 ends the process of this flowchart.

As described above, the inspection apparatus according to the present embodiment includes an image reading unit that reads a document. The inspection apparatus compares a read image obtained by reading a chart printed by the printing apparatus by an image reading unit with a reference image that is a correct image of the chart, and generates distortion information of when read by the image reading unit. In addition, the inspection apparatus corrects the inspection target image obtained by reading the printed matter by the printing apparatus by the image reading unit using the generated distortion information, and aligns the corrected first corrected image with the reference image of the printed matter. Furthermore, the inspection apparatus compares the second corrected image subjected to the alignment with the reference image of the printed matter to inspect defects of the printed matter. According to the present embodiment, it is possible to correct the variation in the distortion of the inspection target image read for each sheet and improve the alignment accuracy between the inspection target image and the reference image. Specifically, according to the present invention, a large tendency of distortion is corrected using the first distortion correcting process using the distortion information based on the mark position of the chart 601. Furthermore, distortion for each image that cannot be completely corrected by the first distortion correction can be corrected using the second distortion correcting process based on the comparison between the reference image and the first distortion corrected image. As described above, the alignment can be made highly accurate by performing the two-stage distortion correction.

MODIFICATION EXAMPLES

The present invention is not limited to the embodiments described above, and various modifications can be made. For example, in the distortion information generating process, it is not always necessary to print a chart on a sheet to generate distortion information. If the print settings (sheet type, sheet size, and double-sided/one-sided printing) are the same, the partial magnification variation is also distorted in the same manner. In the embodiment described above, the method of generating the distortion information every time the inspection setting is performed has been described, but if the print setting is the same as the print setting previously set by the user, the previously acquired distortion information may be reused. This can reduce the cost of printing the chart.

<Configuration of Inspection System>

Figure 13:
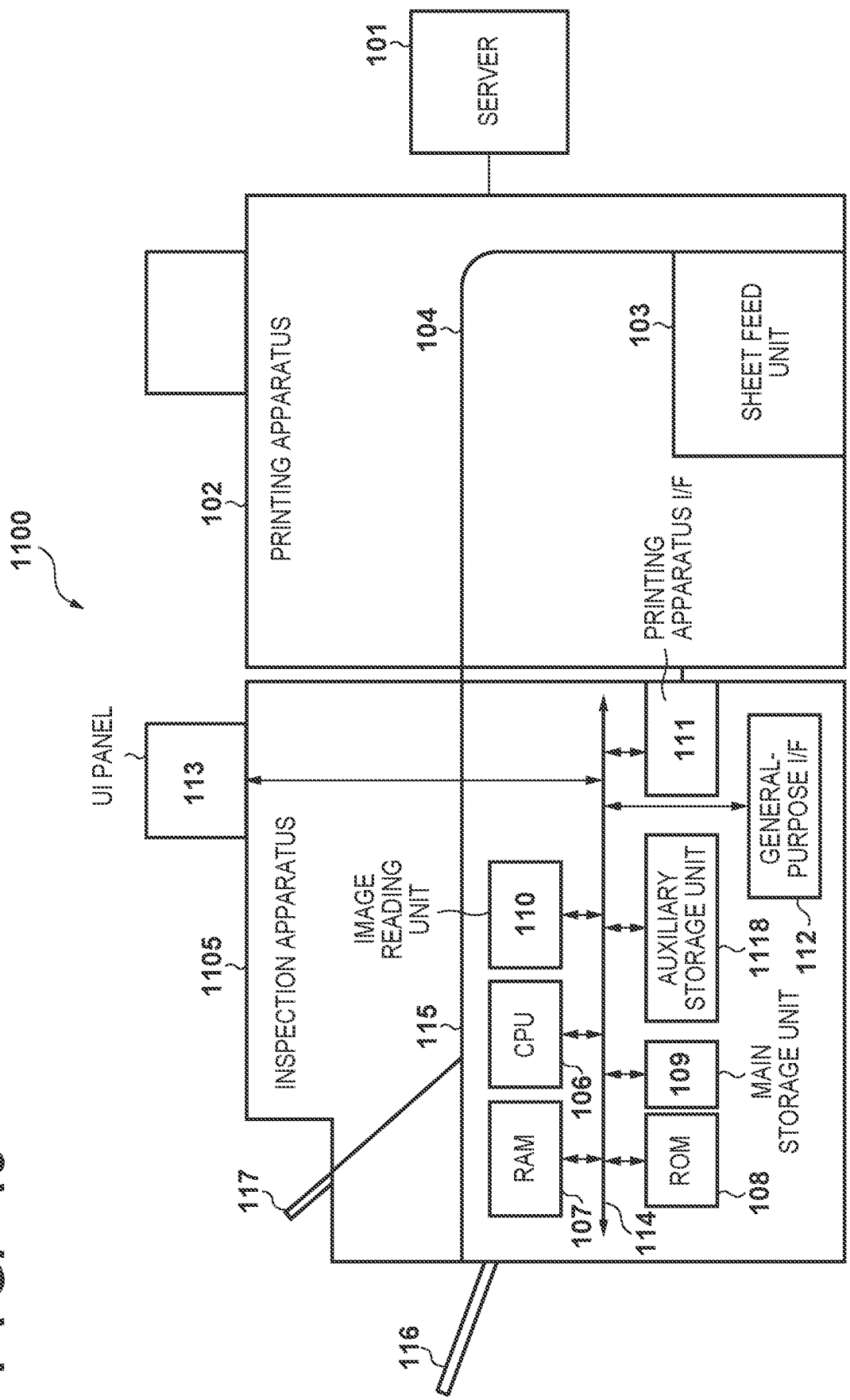
FIG. 13 is a diagram illustrating a configuration of an inspection system including an inspection apparatus and an auxiliary storage unit according to one embodiment.

A configuration example of the inspection system 1100 including the inspection apparatus 1105 according to the present modification example will be described with reference to FIG. 13. Here, a difference from FIG. 1 in the above embodiment will be mainly described. The same configurations and controls as those in the above embodiment are denoted with the same reference numerals, and description thereof will be omitted.

The inspection apparatus 1105 according to the present modification example further includes an auxiliary storage unit 1118 in addition to the configuration of FIG. 1. The auxiliary storage unit 1118 stores the distortion information generated by the distortion information generating module in association with the inspection setting (print setting).

<Distortion Information Generating Process>

Figure 14:
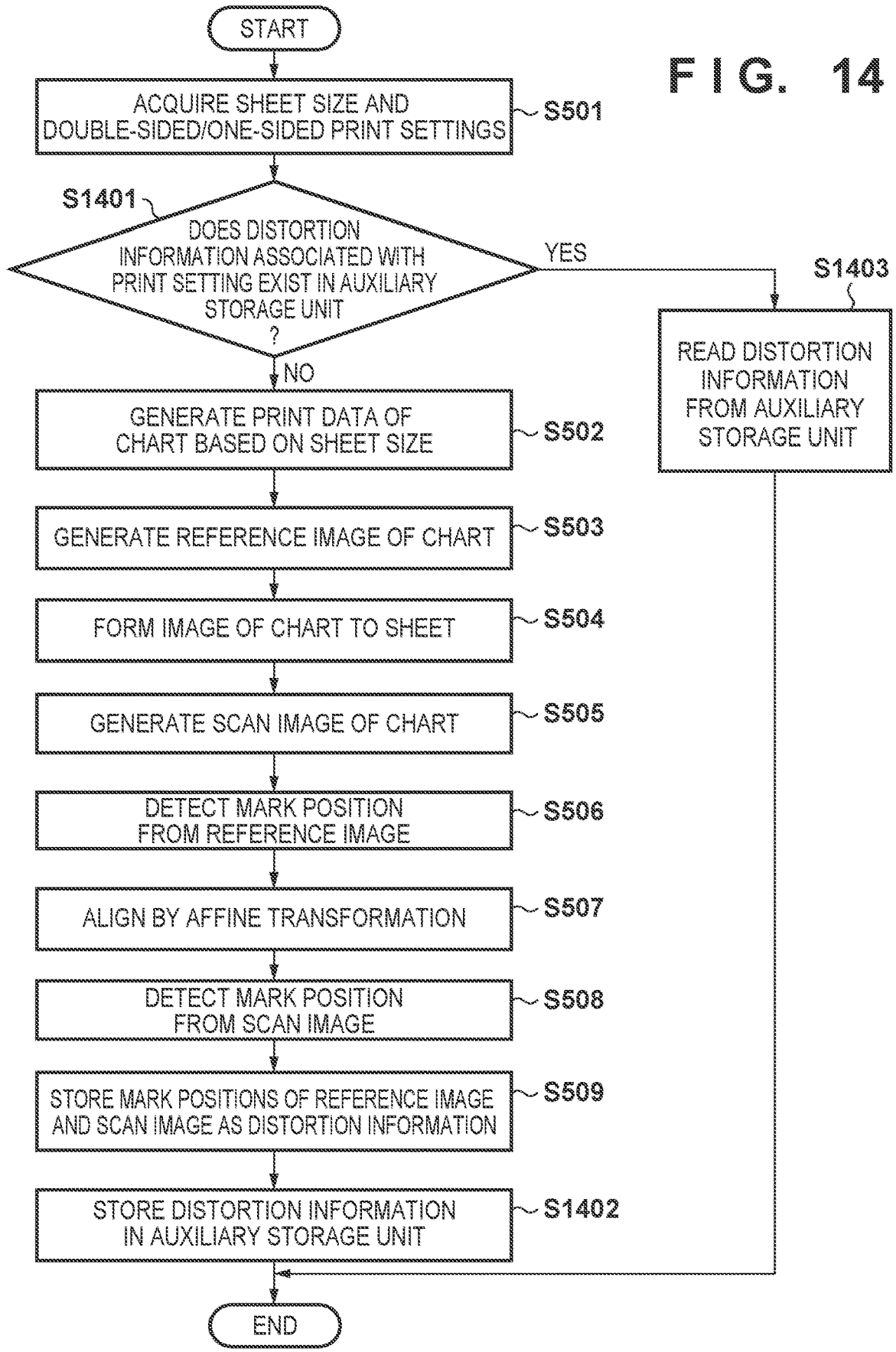
FIG. 14 is a flowchart illustrating another procedure of the distortion information generating process according to one embodiment.

Next, another processing procedure of the distortion information generating process in S302 described above will be described with reference to FIG. 14. The process explained below is realized, for example, when the CPU 106 reads out a program stored in the ROM 108 into the RAM 107 and executes the program. Note that the same reference numerals are given to the numbers of processing steps for performing the same processing and control as those in the flowchart of FIG. 5 of the above embodiment, and the description thereof will be omitted.

After acquiring the print setting in S501, in 51401, the distortion information generating module 203 checks whether distortion information associated with the print setting already exists in the auxiliary storage unit 1118. When determined that the distortion information exists, the process proceeds to S1403, and the distortion information generating module 203 reads the distortion information from the auxiliary storage unit 1118, stores the distortion information in the main storage unit 109, and ends the process of this flowchart.

On the other hand, when determined that the distortion information does not exist, the process proceeds to S502, and distortion information is generated by the processes (S502 to S509) similar to those in the above embodiment. Subsequently, in S1402, the distortion information generating module 203 stores the distortion information in the auxiliary storage unit 1118 in association with the inspection setting (print setting) so that the distortion information can be identified, and ends the process of this flowchart.

In this modification example, if the print setting is the same as those previously set by the user, previously acquired distortion information may be reused. Therefore, the cost of printing the chart can be reduced.

ADDITIONAL EMBODIMENTS

In the above embodiment, after the first distortion corrected image is generated by the first distortion correction in S306 above, the second distortion correction in S307 above is performed. In the following embodiment, an example will be described in which the second distortion correction in S307 is performed without generating the first distortion corrected image in the first distortion correction in S306, in the processing procedure of the inspection process illustrated in FIG. 3. Here, differences from the above embodiment will be mainly described. The same configurations and controls as those in the above embodiment are denoted with the same reference numerals, and description thereof will be omitted.

<First Distortion Correcting Process>

Figure 15:
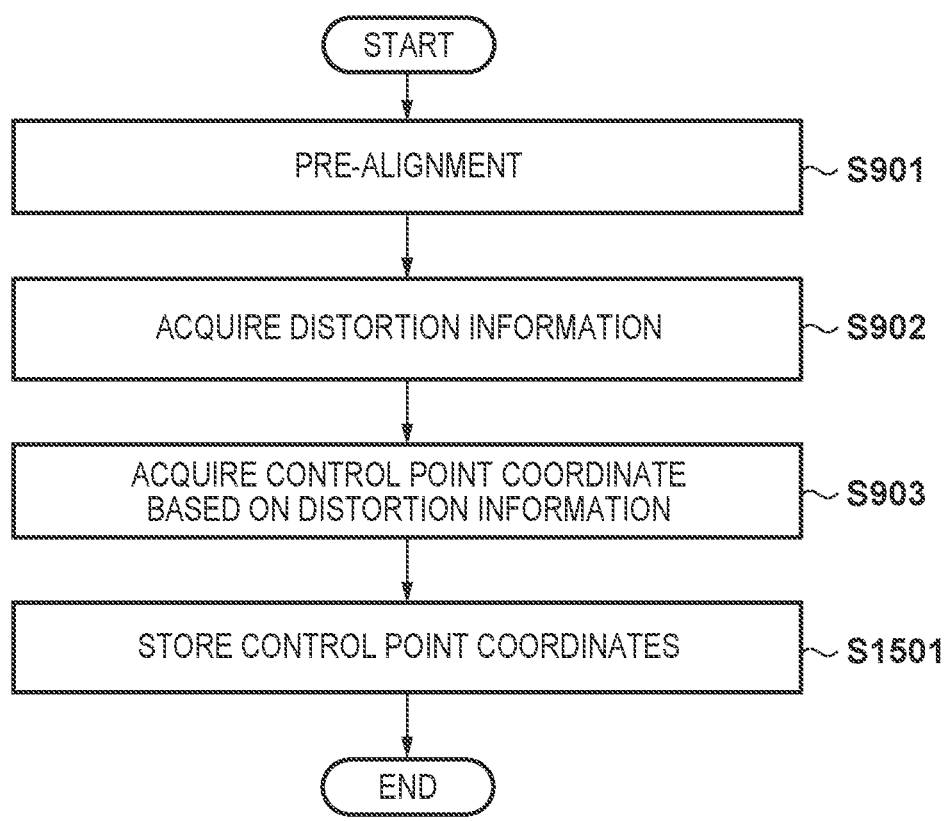
FIG. 15 is a flowchart illustrating another procedure of the first distortion correcting process according to one embodiment.

First, another processing procedure of the first distortion correcting process of S306 above will be described with reference to FIG. 15. The process explained below is realized, for example, when the CPU 106 reads out a program stored in the ROM 108 into the RAM 107 and executes the program.

Since the processes of S901 to S903 are already similar to the processes of the flowchart of FIG. 9, the description thereof will be omitted. After the calculation of the control point coordinates based on the distortion information in S903, the distortion information generating module 203 stores the control point coordinates in the main storage unit 109 in S1501, and ends the process of this flowchart.

<Second Distortion Correcting Process>

Figure 16:
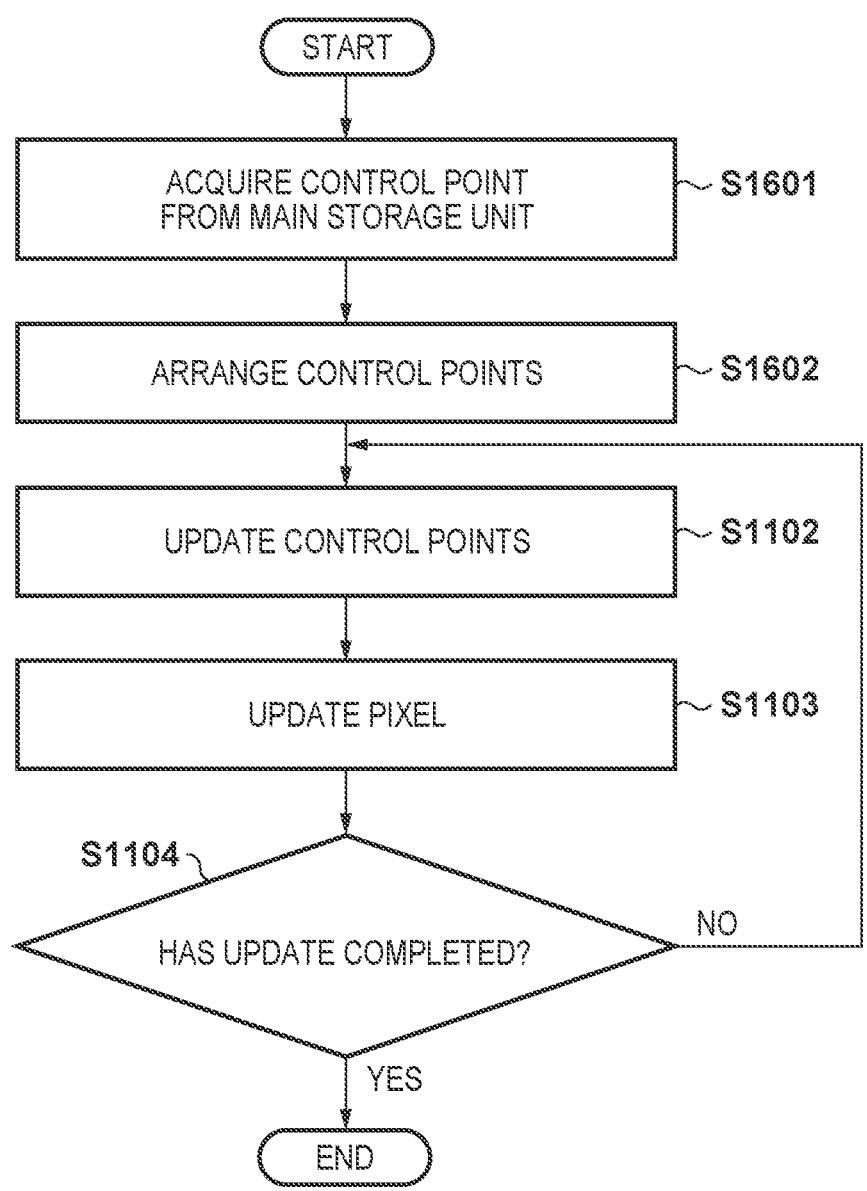
FIG. 16 is a flowchart illustrating another procedure of the second distortion correcting process according to one embodiment.

Next, another processing procedure of the second distortion correcting process in S307 above in the present embodiment will be described with reference to FIG. 16. Hereinafter, the reference image is indicated by T, the inspection target image is indicated by I, and the image subjected to the second distortion correcting process is indicated by an alignment image (second corrected image) I″. The process explained below is realized, for example, when the CPU 106 reads out a program stored in the ROM 108 into the RAM 107 and executes the program.

In S1601, the alignment processing module 204 acquires the control point coordinates (second control point) stored in S1501. In S1602, the alignment processing module 204 arranges the acquired second control point. Therefore, the number of control points (second control points) is equal to the number L×M of control points (first control points) used in the first distortion correcting process.

In the S1102, the alignment processing module 204 updates the positions of the control points. The update equation is expressed by the above equation (12). Here, $\nabla c$ is expressed by the following equation (16). The difference from the above formula (13) is that the difference in pixel value is calculated using the inspection target image instead of the first distortion corrected image.

In S1103, the alignment processing module 204 updates the pixels according to the update of the control point in S1102. The update is executed based on the following equation (17). The difference from the above equation (14) is that an image is generated using an inspection target image instead of the first distortion corrected image. Thereafter, in S1104, the alignment processing module 204 determines whether or not the update of the pixel is completed, and ends the process of this flowchart when determined that the update of the pixel is completed.

[Equation 5]

$$\nabla c = \frac{\partial}{\partial p_{l,m}} \sum_{D_{l,m}} |I(x, y) - T(x, y)|^2 \quad (16)$$

$$I''(x, y) = I(w(x, y)) \quad (17)$$

In the present additional embodiment, the first distortion corrected image is not generated. Therefore, it is not necessary to secure a main storage area for holding the first distortion corrected image. Naturally, it is necessary to hold the control point calculated by the first distortion correction, but since the control point is smaller than the capacity required to hold the image, the capacity of the main memory can be reduced.

In addition, the present invention may be applied to a system including a plurality of devices, for example, a host computer, an interface device, a reader, and a printer, or may be applied to a device including one device, for example, a copier or a facsimile machine.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2022-066492, filed Apr. 13, 2022, and 2022-139347, filed Sep. 1, 2022, which are hereby incorporated by reference herein in their entirety.

What is claimed is:

1. An inspection apparatus comprising:
a reading unit configured to read a document;
at least one memory device that stores a set of instructions; and
at least one processor that executes the set of instructions to
compare a read image obtained by the reading unit reading a chart printed by a printing apparatus with a reference image serving as a correct image of the chart to generate distortion information when reading by the reading unit,
correct, using the generated distortion information, an inspection target image obtained by the reading unit reading a printed matter from the printing apparatus,
align the corrected first corrected image with a reference image of the printed matter, and
compare a second corrected image, on which the alignment has been performed, with a reference image of the printed matter to inspect defect of the printed matter.

2. The inspection apparatus according to claim 1, wherein a plurality of cross-shaped or quadrangular marks are formed in a grid form on the chart.

3. The inspection apparatus according to claim 2, wherein the at least one processor executes instructions in the memory device to: correct the inspection target image by free form deformation (FFD) using a plurality of first control points for image deformation.

4. The inspection apparatus according to claim 3, wherein the at least one processor executes instructions in the memory device to: arrange a plurality of first control points in the inspection target image based on the distortion information, and generate the first corrected image according to coordinates of the plurality of arranged first control points in the inspection target image.

5. The inspection apparatus according to claim 4, wherein the plurality of first control points are arranged in a grid form in the inspection target image.

6. The inspection apparatus according to claim 5, wherein the number of the plurality of first control points is larger than the number of marks included in the chart.

7. The inspection apparatus according to claim 2, wherein the at least one processor executes instructions in the memory device to: perform alignment of the first corrected image and a reference image of the printed matter by free form deformation (FFD) using a plurality of second control points for image deformation.

8. The inspection apparatus according to claim 7, wherein the at least one processor executes instructions in the memory device to: arrange a plurality of second control points in the first corrected image, update the plurality of second control points according to a reference image corresponding to the printed matter, and update pixels of the first corrected image to generate the second corrected image.

9. The inspection apparatus according to claim 8, wherein the plurality of second control points are arranged in a grid form in the inspection target image.

10. The inspection apparatus according to claim 9, wherein the number of the plurality of second control points is larger than the number of marks included in the chart.

11. The inspection apparatus according to claim 1, further comprising: a storage unit configured to store the distortion information generated by the generating unit and a print setting when the chart is printed in association with each other;
wherein the at least one processor executes instructions in the memory device to: in a case where the distortion information associated with the same print setting as the print setting of when printing the chart is already stored in the storage unit, acquire the distortion information stored in the storage unit without printing the chart.

12. The inspection apparatus according to claim 11, wherein the print setting includes setting of at least one of a sheet type, a sheet size, and whether or not to perform double-sided printing.

13. The inspection apparatus according to claim 2, wherein the number of the plurality of marks is changed according to a sheet size.

14. The inspection apparatus according to claim 3, wherein the at least one processor executes instructions in the memory device to: store a plurality of acquired first control points without generating the first corrected image; and
arrange the plurality of stored first control points as initial values of the plurality of second control points.

15. A control method of an inspection apparatus including a reading unit configured to read a document, the control method comprising:
comparing a read image obtained by the reading unit reading a chart including a mark for acquiring distortion information printed by a printing apparatus and a reference image serving as a correct image of the chart, and generating distortion information when reading by the reading unit; and
correcting, using the generated distortion information, an inspection target image obtained by the reading unit reading a printed matter from the printing apparatus;
aligning the first corrected image corrected in the correcting with a reference image of the printed matter; and
comparing a second corrected image aligned in the aligning with a reference image of the printed matter to inspect a defect of the printed matter.

16. A non-transitory computer-readable storage medium storing a computer program for causing a computer to execute each step in a control method of an inspection apparatus including a reading unit configured to read a document, wherein the control method comprises:
comparing a read image obtained by the reading unit reading a chart including a mark for acquiring distortion information printed by a printing apparatus and a reference image serving as a correct image of the chart, and generating distortion information when reading by the reading unit;
correcting, using the generated distortion information, an inspection target image obtained by the reading unit reading a printed matter from the printing apparatus;
aligning the first corrected image corrected in the correcting with a reference image of the printed matter; and
comparing a second corrected image aligned in the aligning with a reference image of the printed matter to inspect a defect of the printed matter.

* * * * *